United States Patent [19]

Horanoff

[11] 4,074,567
[45] Feb. 21, 1978

[54] LOW INTERACTION WIND TUNNEL BALANCE

[75] Inventor: Eugene V. Horanoff, Clarksville, Md.

[73] Assignee: The United States of America as represented by the Secretary of the Navy, Washington, D.C.

[21] Appl. No.: 794,506

[22] Filed: May 6, 1977

[51] Int. Cl.$^2$ ............................................ G01M 9/00
[52] U.S. Cl. ..................................................... 73/147
[58] Field of Search .............................. 73/147, 133 R

[56] References Cited

U.S. PATENT DOCUMENTS

| | | | |
|---|---|---|---|
| 3,159,027 | 12/1964 | Curry | 73/147 |
| 3,540,273 | 11/1970 | Ziegler et al. | 73/147 |
| 3,552,201 | 1/1971 | Horanoff | 73/147 |

Primary Examiner—Donald O. Woodiel
Attorney, Agent, or Firm—R. S. Sciascia; A. L. Branning; W. C. Anderson

[57] ABSTRACT

A wind tunnel roll-moment and axial force balance which minimizes mechanical and electrical interaction due to pitch and yaw loads on the roll moment and axial force measurement sections. The axial load section has four beams arranged in a cruciform connected via a plurality of deflection beams to a gage beam of thin-rectangular cross section located at the aft portion of the axial section. The roll section has a series of torsion webs circumferentially spaced at the lower and upper periphery of the section. A plurality of thin rectangular beams including the gage beam connect the forward and aft portions of the non-webbed area.

23 Claims, 28 Drawing Figures

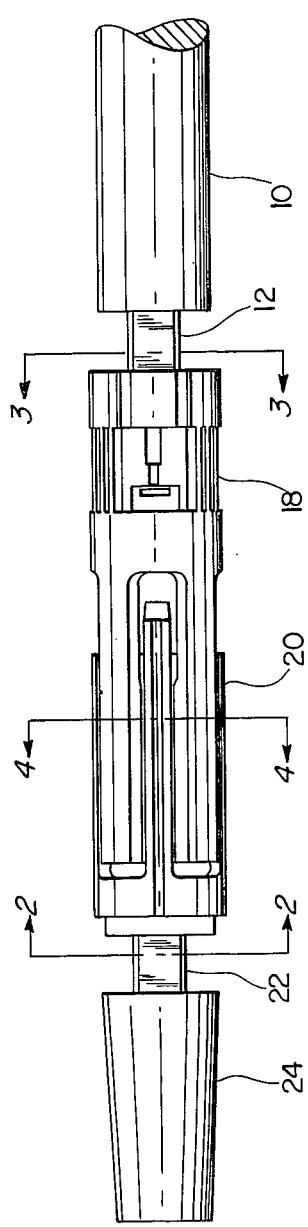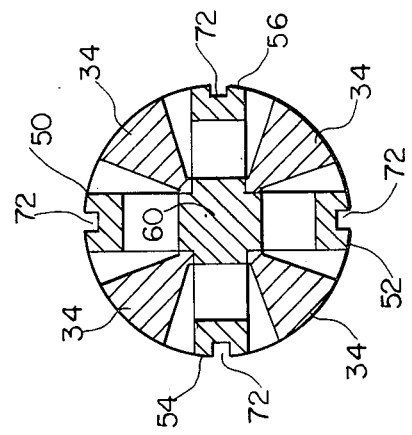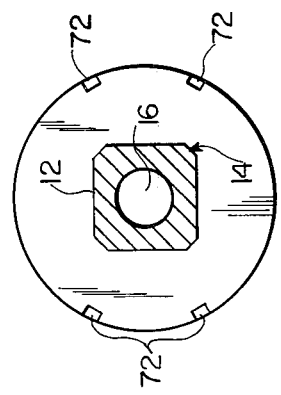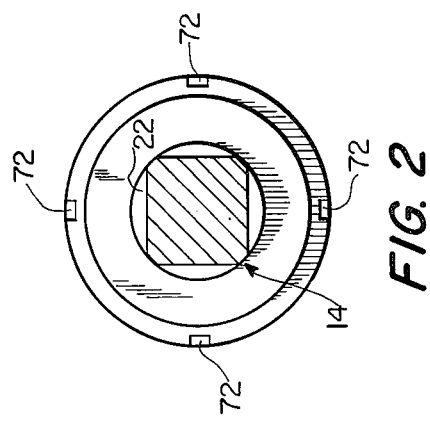

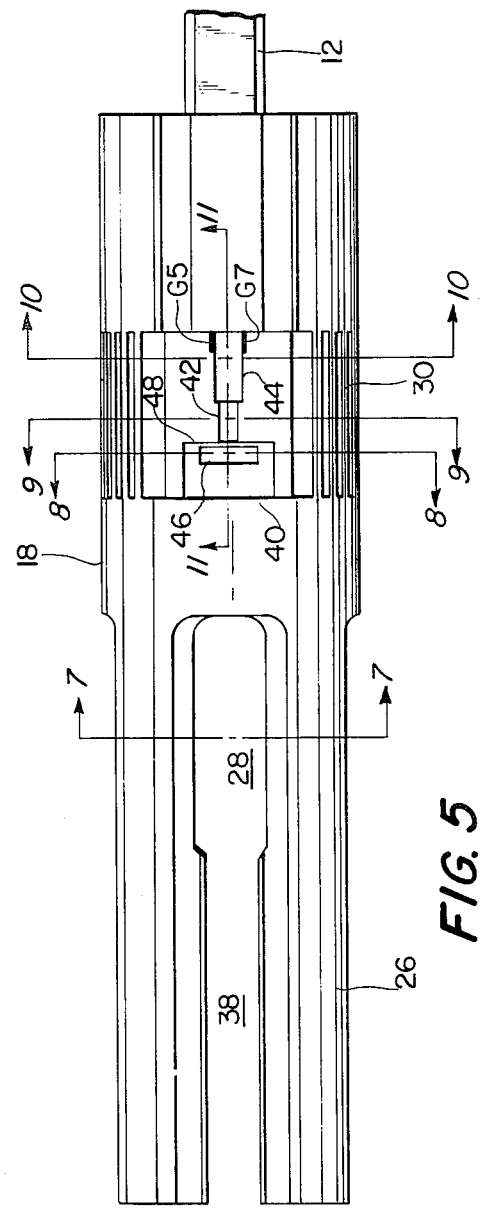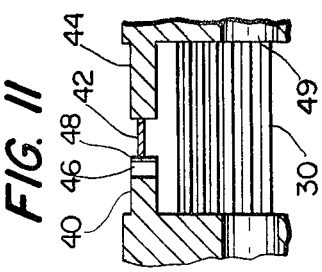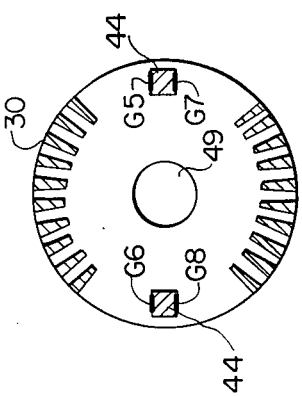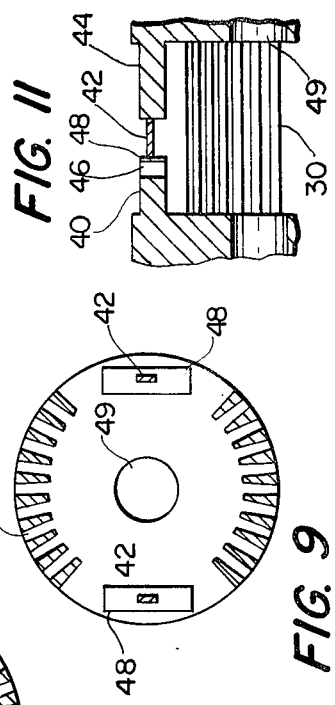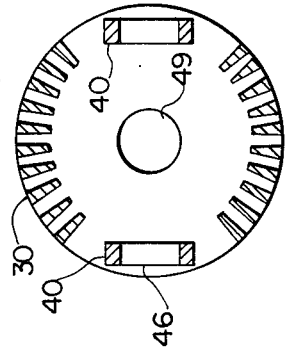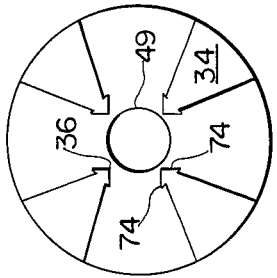

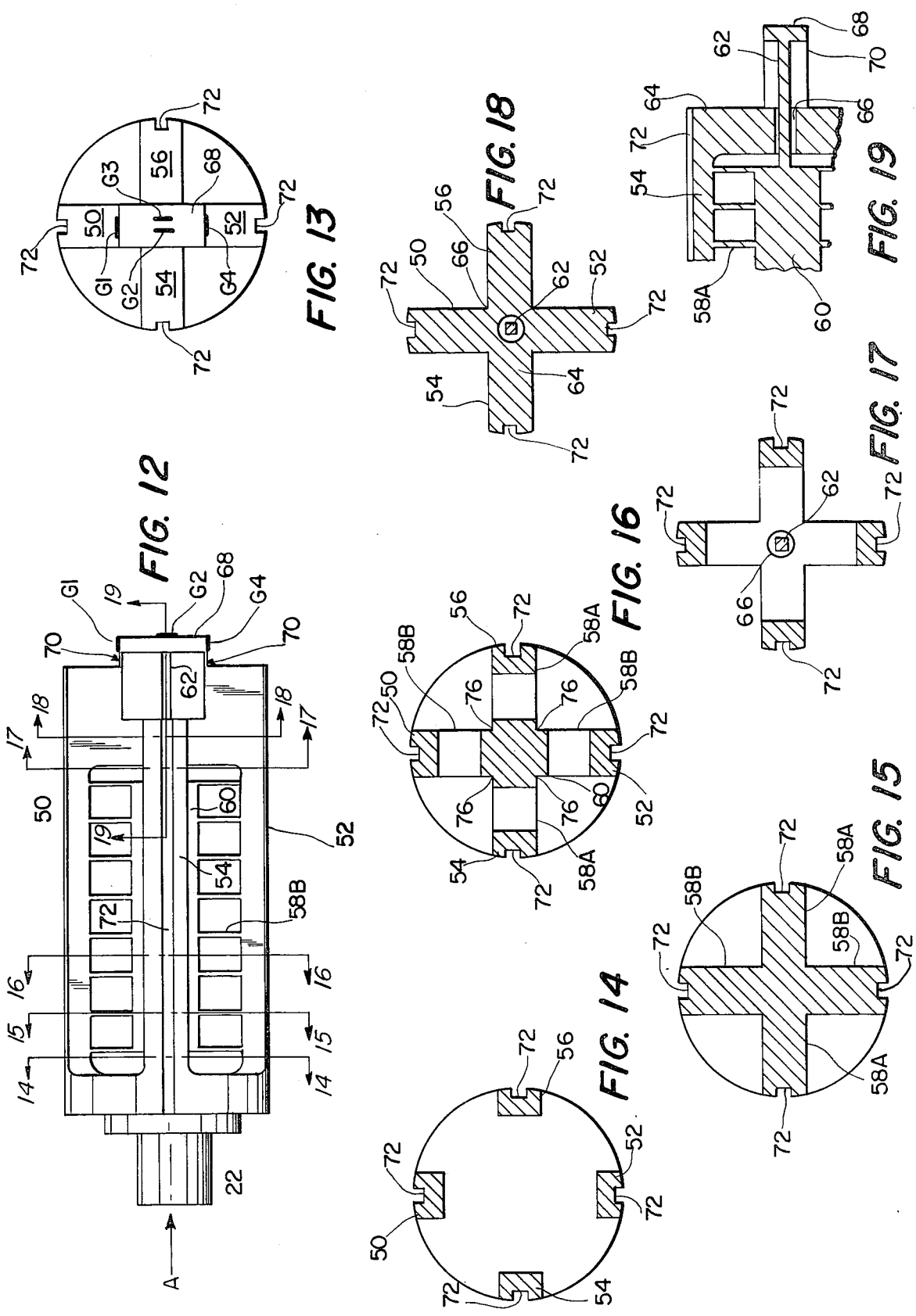

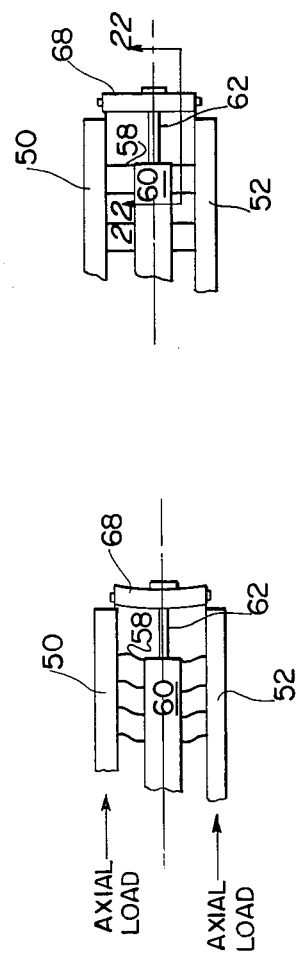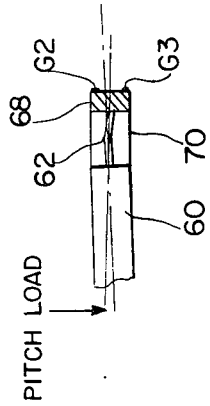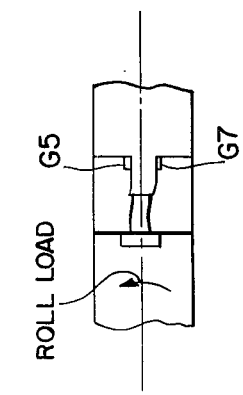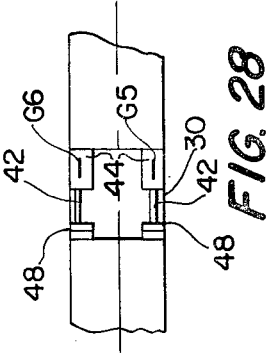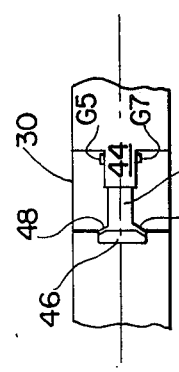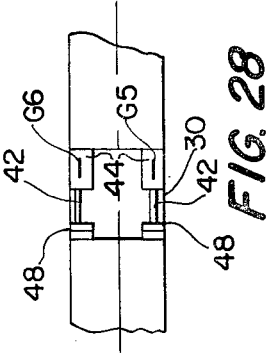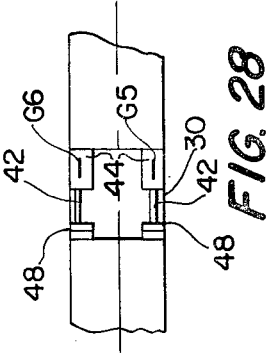

LOW INTERACTION WIND TUNNEL BALANCE

BACKGROUND OF THE INVENTION

The present invention relates generally to a strain gage balance beam of the type used in wind tunnel evaluation of aerodynamic shapes in which a model of the test shape is mounted with the cantilever mounted balance beam being instrumented so as to measure aerodynamic forces and moments acting upon the model.

In particular, the invention relates to a wind tunnel balance which includes an axial force and a rolling moment measurement section in which the sections are designed to produce negligible mechanical and electrical interaction.

In wind tunnel experimentations it is desirable to have an accurate method of measuring the normal, yaw, and axial forces and the pitching, yawing, and rolling moments on a wind tunnel model through a large load range using only one wind tunnel balance. Prior types of strain gage balances have been successfully utilized to measure the forces in wind tunnel models. The moments and forces acting on the model are usually resolved into the three components of force and three components of moment by providing different members within the balance that are sensitive to only one or two components. Each of the members carry strain gages which are connected in combinations that form Wheatstone bridge circuits. By appropriately connecting the strain gages, the resulting Wheatstone bridge circuit unbalances can be resolved into readings of the six components of force and moment. However, the normal and yaw load interaction on rolling moments (roll) and axial forces (axial) are quite high for a typical balance (approximately 6 percent on roll and 13 percent on axial) so that the accuracy of axial and roll load measurements are affected to a large extent by the magnitude of the normal and yaw loads.

As an example of axial interaction, assume that a 50 lb. normal force and a 5 lb. axial force is statically imposed on a wind tunnel model using a conventional balance. The 50 lb. normal force would produce an apparent load of 6.5 lb (50 lb. × 0.13) of axial load with the balance's instrumentation recording 11.5 lb. axial load of which 6.5 lb. would be attributed to the interaction phenomenon. Calibration of the balance can mitigate the effects of interaction to within about ± 5 percent which in the above example would be equivalent to ± 0.325 lb. However, the effects of this error can be readily seen in that 0.325 lb. is 6.5 percent of the 5 lb. applied and desired to be measured axial force. This accuracy is insufficient to satisfy the needs and demands of the aerodynamist. To attempt to counteract this inaccuracy a balance rated at 50 lb. would have to be used cutting the axial error down to ± 3.25 percent which would be barely acceptable.

Roll interaction in the presence of a pitch or yaw load is more severe even though the percentage of interaction is theoretically much lower under these loads. The rate of normal of yaw force to rolling moment can be much larger, for example 50:1 so that the roll interaction for a 50 lb. normal or yaw force would be 3 in. lb. of rolling moment (50 × 0.6). The actual applied rolling moment would be 1 in. lb.; therefore, the balance jwould be measuring 4 in. lb. of which 3 in. lb. would be interaction. At the same ± 5 percent interaction calibration accuracy, the error would be ± 0.15 in. lb. With an actual applied rolling moment of 1 in. lb., the error would be ± 15 percent which again is unacceptably too high.

Thus it should be apparent that several balances of varying load measuring sensitivities are needed to cover the full load range of test capabilities desired in any wind tunnel facility.

SUMMARY OF THE INVENTION

Accordingly, one object of this invention is to provide a new and improved wind tunnel balance for measurement of forces resulting in an axial force and a rolling moment acting externally on an aerodynamic body.

Another object of the instant invention is to provide new and improved axial force and roll moment sections of a wind tunnel balance desired to produce almost zero mechanical and electrical interaction and yet have full load range measurement capability.

A further object of the present invention is the provision of a wind tunnel balance in which the improved axial force and roll moment sections can be used individually or in combination with conventional pitch and yaw load measurement sections.

Briefly, in accordance with one embodiment of this invention, these and other objects are attained by providing a wind tunnel balance having conventional pitch and yaw load measurement sections with an axial load section having four longitudinal beams of cruciform arrangement connected via small beams to a gage beam of thin-rectangular cross section located at the aft portion of the axial section. The small connecting beams permit pitch and yaw deflections without affecting axial loads. In the roll section, a series of torsion webs are circumferentially spaced at the upper and lower periphery of the section. A plurality of beams of thin, rectangular cross section connect the forward and aft non-webbed portions. Strain gages are located on the aftmost point of the beams, an area of low stress relative to pitch and yaw loads. The combination of the thin beams and the gage positions minimize interaction loads.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 1 is a general overall view of the balance.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 1.

FIG. 5 is a side view of the roll load measuring section.

FIG. 6 is an end view of the axial fork.

FIG. 7 is a sectional view taken along line 7—7 of FIG. 5.

FIG. 8 is a sectional view taken along line 8—8 of FIG. 5.

FIG. 9 is a sectional view taken along line 9—9 of FIG. 5.

FIG. 10 is a sectional view taken along line 10—10 of FIG. 5.

FIG. 11 is a sectional view taken along line 11—11 of FIG. 5.

FIG. 12 is a side view of the axial load measuring section.

FIG. 13 is an end view of the axial load measuring section.

FIG. 14 is a sectional view taken along line 14—14 of FIG. 12.

FIG. 15 is a sectional view taken along line 15—15 of FIG. 12.

FIG. 16 is a sectional view taken along line 16—16 of FIG. 12.

FIG. 17 is a sectional view taken along line 17—17 of FIG. 12.

FIG. 18 is a sectional view taken along line 18—18 of FIG. 12.

FIG. 19 is a sectional view taken along line 19—19 of FIG. 12.

FIG. 20 is a schematic load diagram of the axial section undergoing an axial load.

FIG. 21 is a schematic load diagram of the axial section with a pitch load.

FIG. 22 is an enlarged sectional view along line A-A showing the load pattern on the central beam, cross beam and gage beam due to a pitch load.

FIG. 23 is a schematic load diagram of the axial section with a yaw load.

FIG. 24 is a schematic load diagram of the roll section with a roll load as seen from the "left side."

FIG. 25 is a schematic load diagram of the roll section with a roll load as seen from the "right side."

FIG. 26 is a schematic load diagram shows the roll section with a pitch load.

FIG. 27 is a "top" view of the roll section with a yaw load.

FIG. 28 is a "side" view of the roll section with a yaw load.

DESCRIPTION OF THE PREFERRED EMBODIMENT

Referring now to the drawings wherein like reference characters designate identical or corresponding parts throughout the several views and more particularly to FIG. 1 thereof wherein the wind tunnel balance of the present invention is shown as consisting of a conventional sting 10 rigidly carried by a wind tunnel (not shown) and integrally connected to a conventional pitch and yaw load measuring section 12. Section 12, as seen also from FIG. 3, is shown as a parallelpiped of square cross section having truncated corners 14 and a wire hole 16 providing for the passage of instrumentation electrical wires. An integrally formed roll moment load measuring section or cage 18, which is more fully described hereinafter, is preferably integrally connected to yaw and pitch section 12 with an integrally formed axial force load measuring section or cage 20, described infra, being connected e.g., by brazing, to roll section 18. Axial section 20, second pitch and yaw load section 22, and model mounting taper 24 also preferably may form a unitary piece. Taper 24 is rigidly secured to a test model (not shown) in such a manner that any resultant forces and moments acting on the model will be transferred to the balance. Referring also to FIG. 2, it is seen that second pitch and yaw section 22 is identical to section 12 except for the absence of a wire hole.

Referring now to FIG. 5, roll moment load measuring section 18 is shown as a unitary piece made up of axial fork 26, axial recess 28, torsion webs 30 and a plurality of unitary (see FIGS. 8, 9, 10) thin beams. As seen from FIG. 6 axial fork 26 is shown to consist of four beams 34 of generally triangular cross section whose apices 36 are of a particular configuration hereinafter described. A central orifice 38 leads to axial recess 28 which provides clearance for an insertion of the axial force load section 20 of FIG. 12. Triangular beams 34 and recess 28 co-operate to respectively secure the roll section and to provide clearance for the axial section as will subsequently be understood.

Torsion webs 30 are circumferentially spaced at the upper and lower periphery of the section and arranged in a cylindrical array, see FIGS. 8, 9, 10. The webs are of a generally wedge cross-sectional configuration. Inasmuch as there is a pair of duplicate plurality of thin beams diametrically opposed as seen in FIGS. 8, 9, 10 a discussion of same will be with respect to one set. The plurality of thin beams is shown as consisting of a support beam 40, a transverse thin beam 48 an intermediate beam 42 and a roll gage beam 44. FIGS. 5 and 8 show support beam 40 as having a thin rectangular cross section with a rectangular recess 46. Intermediate beam 42 (see FIG. 9) is integrally formed with support beam 40 via a transverse thin beam 48, formed by recess 46, which acts structurally like a hinge or pin joint. As seen from a perusal of FIGS. 5, 10, and 11, roll gage beam 44 is integrally connected to intermediate beam 42 and has a square cross section. Finally as seen from FIG. 11, wire hole 49 is provided for measurement instrumentation wiring.

Torsion webs 30 allow twist deflection for the balance for roll load measurement but provide a constraint on deflections along the pitch and yaw axes. Thin beam 48 serves the purpose of reducing any axial force or pitching moment or yawing moment potentially transmitted to the roll gage beam 44. Intermediate beam 42 and transverse thin beam 48 reduces any side force and yaw load which roll gage beam 44 may experience during loading of the wind tunnel model undergoing test. Support beam 40 thus serves two functions: (1) It supports pin joint beam 48 and (2) allows beams 42, 44 to be shorter in length than webs 30. Due to its shorter length, beam 44 will be subjected to a large stress value thereby providing great roll loading sensitivity for the balance.

Referring now to FIG. 12 axial force loading measurement section or cage 20 is shown as a single piece consisting of two pairs of longitudinal beams 50, 52; 54, 56 of cruciform arrangement (see also FIG. 14) connected via axial deflection beams 58A, 58B (see FIG. 15) to fixed central beam 60 (see FIG. 16). Central beam 60 is fixed with respect to the longitudinal beams since it is fixed to the roll section in a manner which will be seen shortly. Connected to central beam 60 is a cross beam 62, shown as having a square cross section. The longitudinal beams interconnect at the right hand portion (aft section) of axial section 20 to provide a transverse wall 64 (see FIGS. 18, 19) in which is located hole 66. Bore 66 allows square cross beam 62 to interconnect central beam 60 to an axial gage beam 68, shown in FIGS. 12 and 13 as a rectangular parallelpiped. Gage beam 68 is also integrally interconnected to longitudinal beams 50, 52 via thin flexure beams 70 which act like pin joints.

Longitudinal beams 50, 52, 54, 56 serve the purpose of connecting the axial deflection beams 58A, 58B to the front or forward portion of the balance and carry the roll moment and pitch, yaw loads. The longitudinal beams also provide for instrumentation wire grooves 72. Longitudinal beams 50, 52, 54, 56 are interconnected (see FIG. 18) for the purpose of making the longitudinal beams more rigid and causing them to react as a unit, thus reducing interaction. Since central beam 60 is fixed to the roll section 18, and since the axial deflection beams act like leaf springs, the axial deflection beams 58A, 58B allow the longitudinal beams to respond and move aft or towards the right of FIG. 12 under an axial load or force A. The axial deflection beams 58A, 58B also take pitch, yaw loads, and roll moments without allowing much deflection along the roll moment and pitch, yaw directions of the gage beam 68. Axial deflection beams 58A primarily resist deflection from pitch forces and moments with beams 58B resist deflections from yaw forces and moments with both pairs of beams reacting equally to roll moments. Cross beam 62 which connects the fixed central beam 60 to the axial gage beam 68 is made thin to minimize twisting in gage beam 68 due to pitch or yaw or roll loads. Thin pin joint beams 70 likewise reduce interaction and transmit the axial loading experienced by the longitudinal beams to the axial gage beam 68.

Referring now to FIG. 4 the interconnection between the axial force and roll moment measurements sections is seen as an interdigitation between the axial fork 26 and recess 28 of the roll section with the longitudinal beams 50, 52, 54, 56 and central beam 60 of the axial section. As seen from FIG. 6 the surfaces 74 forming the apices 36 of triangular beams 34 in the area of the axial fork 26 form an angle of 45° with respect to the centerline of each triangular beam. Central beam 60 (see FIG. 16) is configured as a parallelpiped with a cruciform cross section and corners 76 which provide a mating surface for the apices 36 of the triangular beams 34. Along the lines of contact between the surfaces of the coacting portions of the beams 34 and central beam 60 a bond is formed, e.g. by silver brazing although other means of bonding are possible. The aft portion of the axial section fits without any structural constraint within axial recess 28. Thus the longitudinal beams of the axial section can transmit the axial loading to gage beam 68 with a minimization of mechanical interaction. Central beam 60 is therefore seen as fixed to the roll section relative to the longitudinal beams 50, 52, 54, 56 of the axial section.

The location of the strain gages designated G1, G2, G3, G4 for the axial load measuring section is shown in FIG. 13 with FIGS. 5 and 10 showing the location of the strain gages shown as G5, G6, G7, G8 for the roll moment load measuring section. The minimization of the electrical interaction is shown by the following examples.

Axial Section With Axial Load

Under an axial load A (see FIG. 20) the axial deflection beams 58, acting like leaf springs, deflect but since the central beam 60 is fixed relative to the four longitudinal beams 50, 52, 54, 56 there is relatively no movement of the central beam. The gage beam 68 thus can be modeled as a beam supported at its center undergoing tip or end loads. Thus gages G1 and G4 would remain unstressed or neutral at all times with gages G2 and G3 being in compression. The resultant Wheatstone bridge would produce an output proportional to the axial force since the circuit would be unbalanced. The electrical circuit utilized in this invention is similar to the conventional Wheatstone bridge except that in the instant circuit two gages always remain neutral.

Axial Section With Pitch Load

When a pitch load is applied to the axial section, as shown in FIG. 21, the longitudinal centerline of central beam 60 becomes skew (note FIG. 22) with respect to the longitudinal centerline of longitudinal beams 50, 52, 54, 56. This slight rotation will tend to cause mechanical interaction in two ways on axial gage beam 68 which obviously is undesirable. First as central beam 60 rotates, it becomes shorter in length along the centerline of longitudinal beams 50, 52, 54, 56 causing a slight pulling on cross beam 62 which will cause a deflection in gage beam 68 showing up as a measured axial force. Fortunately, this deflection is very small, about one part in 400,000 and can be considered as zero interaction. Secondly, as central beam 60 rotates it also rotates cross beam 62 slightly, which in turn tends to twist gage beam 68. This twist will be very slight, since cross beam 62 is a relatively long slender beam and gage beam 68 is comparitively quite large. However, there will be some minimal twist in gage beam 68 with the interaction being one part in 490,000 assuming 120-ohm gages with a 1-ohm change in gages G2 and G3.

Axial Section With Yaw Load

When a yaw load is applied to the axial section (see FIG. 23) longitudinal beam 50 will move in relation to beam 52 tending to cause gage beam 68 to deform in a slight "S" shape. This "S" bend will be very small since gage beam 68 is attached to longitudinal beams 50, 52 by thin beams 70 which will tend to act as pin joints thereby allowing gage beam 68 to rotate without really forcing it into an "S" shape. The resultant Wheatstone Bridge will see gages G1 and G4 neutral, as always, and gages G2, G3, also neutral if they are accurately placed on the center of gage beam 68. With all the gages neutral, zero interaction is indicated. With a careless placement of gages G2 and G3, on gage beam 68, there will be some negligible interaction which will be minimized due to thin beams 70 which mitigates the "S" bending tendency of the gage beam under this loading pattern.

Before discussing roll section electrical interaction it should be noted that in a conventional roll section theoretically zero interaction exists due to a pitch or yaw load but since the gages are mounted in such a highly stressed area even a minute misalignment of gages produces a large amount of electrical interaction. The purpose of the instant roll section, therefore, is to allow the gages to be placed in a relatively low-stressed area when subjected to a pitch and yaw load thereby drastically reducing interaction.

Roll Section With Roll Load

When a roll load is applied, (note FIGS. 24, 25) gages G5, G8 are in compression; gages G6, G7 in tension which is the same observed mechanical behavior of a conventional roll section.

Roll Section With Pitch Load

Under a pitch load (FIG. 26), the present roll section acts in a conventional manner except for the existence of two important features: (1) thin beam 48 acts like a hinge or pin joint, (2) the effective cantilever beam length of gage beam 44 is twice the length of a conventional roll section. Therefore, an equivalent strain gage misalignment in the present balance will have approximately ½ the interaction of a conventional balance.

Thus, theoretically zero interaction would accrue to identically mounted gages.

Roll Section With Yaw Load

As seen in FIGS. 27, 28 the strain gages are mounted at what would normally be a highly stressed area in a conventional balance. Since it is also difficult to properly align the gages in this direction, interaction potentially could be of an undesirable magnitude. Thin beam 48 and intermediate beam 42 make roll gage beam 44 a low stressed beam when loaded in the yaw plane resulting in an interaction reduction 1/80th of a conventional balance.

Modifications of the instant device include the orientation of the axial section gage beam. So long as the beam is oriented perpendicular to the roll axis, the beam may be parallel to either the pitch or yaw axis. Also, while the axial force and rolling moment measurement sections have been shown as a combined unit, it is obvious that either section may be used alone or individually in combination with other load measurement sections.

In using the axial force measurement section alone the fixed central beam 60 would be fixedly attached to a sting or to a pitch and yaw section instead of to the roll section which would, of course, be eliminated. The forward portion of the section would either be attached to a pitch and yaw section or to a model mounting taper. With an individual usage of the rolling moment section the axial fork would be eliminated with the forward portion of the roll section being attached either to a model mounting taper or to a pitch and yaw section. Of course the aft portion of the rolling moment section would have to be connected to a sting or a pitch and yaw section. Thus, it can be seen that the primary advantage of the present invention is that the substantially reduced interaction of pitch and yaw loads on the roll moment and axial force measuring sections allows a given sized wind tunnel balance to be designed for maximum load carrying capabilities while still giving sufficient accuracy to measure extremely small forces. In this way, one balance will take the place of several balances now in use.

Obviously, many other modifications and variations of the present invention are possible in light of the above teachings. It is therefore to be understood, that within the scope of the appended claims, the invention may be practiced otherwise than as specifically described.

What is claimed as new and desired to be secured by Letters Patent of the United States is:

1. A strain gage balance for measuring component forces and moments applied to the body of a test model disposed in a flow field of a test wind tunnel, said balance adapted for mounting at one end to said tunnel by means of a sting and at the other end to said model comprising:

first and second means for measuring pitch and yaw load applied to said model, said sting being connected to the first of said pitch and yaw means, a roll moment measurement section integrally connected to said first pitch and yaw means, said roll section having a plurality of torsion webs spaced at the upper and lower periphery of said roll section and capable of allowing twist deflections for the balance for roll load measurement but providing a constraint on deflections along the pitch and yaw axes, a plurality of beams connecting the forward and aft non-webbed portions of said roll section, said beams consisting of a support beam integral with the forward portion of said roll section, said support beam having a recess therein defining a thin beam, a thin intermediate beam integral with said thin beam, said intermediate beam being integrally connected to a roll gage beam capable of deflection in response to a rolling moment, whereby said thin beam has the capability of reducing any deflections induced in said roll gage beam due to an axial force or pitching moment, said intermediate beam is capable of reducing any side force and yaw load which said roll gage beam may experience;

an axial force measurement cage attached to said roll section, said axial cage being integral with said second pitch and yaw means, said axial cage having longitudinal beams of cruciform construction acting as an integral unit, a plurality of axial deflection beams integrally formed with said longitudinal beams allowing said longitudinal beams to respond as a unit under an axial force without transmitting roll moments or pitch and yaw loads, a central beam fixed to said roll section and integrally formed with said axial deflection beams, a cross beam integrally connected to said central beam at one end and at its other end to an axial gage beam which is capable of deflection in response to an axial force, said axial gage beam also being integrally formed with said longitudinal beams via thin flexure beams, whereby said longitudinal beams transmit said axial load to said axial gage beam, said axial deflection beams being capable of carrying pitch, yaw loads and roll moments without allowing much deflection of the axial gage beam due to pitch, yaw loads and roll moments acting on said model, said thin flexure beams, acting like pin joints, reduce interaction and transmit the axial force loading to said axial gage beam, and;

means responsive to the deflection of said roll and axial gage beams for indicating the magnitude and direction of said rolling moments and axial forces, respectively.

2. A balance as in claim 1 wherein said plurality of beams connecting the forward and aft non-webbed portions of said roll section consists of a first and second set of beams diametrically opposed and located proximate the outer periphery of said roll section, each set of beams consists of a support beam, thin beam, intermediate beam and roll gage beam integrally interconnected with one another.

3. A balance as in claim 2 wherein an axial fork is integrally formed with the forward portion of said roll section, said axial fork having four distinct beams clustered about the longitudinal axis of said roll section, said distinct beams having a triangular cross section, a recess formed within said cluster of triangular beams capable of holding said axial section without constraint therein.

4. A balance as in claim 3 wherein said support beam and said intermediate beam are parallelpipeds of rectangular cross-section, said roll gage beam being a parallelpiped of square cross-section.

5. A balance as in claim 4 wherein said torsion webs are circumferentially spaced along said upper and lower periphery and have a wedge cross-sectional configuration.

6. A balance as in claim 5 wherein said central beam has a generally cruciform cross section, said distinct triangular beams having apices whose forming surfaces mate with and are bonded to the corners of said central beam whereby said central beam is fixed to said roll section and thus fixed relative to said longitudinal beams.

7. A balance as in claim 6 wherein said axial gage beam is a rectangular parallelpiped aligned perpendicular to the longitudinal axis of said balance, strain gages being mounted on a surface of said axial gage beam which is transverse to the longitudinal axis of the balance and also on a pair of the surfaces of said axial gage beam parallel to said axis.

8. A balance as in claim 7 wherein wire grooves are provided along the outer surface of said longitudinal beams, said longitudinal beams being integrally connected and forming a wall near the aft portion of said axial cage proximate said axial gage beam, and a hole in said wall providing for the unrestrained passage of said cross beam.

9. A wind tunnel balance subjected to aerodynamic loads in a flow field of a test wind tunnel, said balance adapted for mounting at one end to said tunnel by means of a sting and at the other end to a test model, comprising in combination:
a roll moment measuring section connected to said sting,
a series of torsion webs distinctly spaced at the upper and lower periphery of said roll section,
a plurality of thin beams of rectangular cross section substantially extending between the forward and aft non-webbed portions of said roll section,
a roll gage beam integrally connected to said plurality of thin beams and to the aft non-webbed portion of said roll section,
an axial force measuring cage interconnected with said roll section and to said model,
said axial cage being integrally formed by four longitudinal beams arranged in a cruciform manner,
a plurality of axial deflection beams integrally formed with said longitudinal beams,
a central beam integrally connected to said plurality of axial deflection beams,
a cross beam integrally connected at one end to said central beam and at its other end to an axial gage beam,
means responsive to the deflection of said roll and axial gage beams for indicating the magnitude and direction of said aerodynamic loads,
whereby said axial deflection beams, central beam, and cross beam allows roll moment, pitch and yaw deflections without affecting axial force loads and said torsion webs, plurality of thin beams of rectangular cross section permit axial force and pitch and yaw deflections without affecting roll meoment deflections.

10. A balance as in claim 9 wherein said roll section has an axial fork and an axial recess, said axial fork being formed by beams of triangular cross section having apices arranged about the longitudinal axis of said balance, said axial recess being formed within said arrangement of said triangular beams whereby a portion of said axial cage is nestled within said axial recess.

11. A balance as in claim 10 wherein said central beam of said axial cage has surfaces which coact and fixedly mate with said apices of said triangular beams whereby said central beam is fixed relative to said longitudinal beams of said axial cage.

12. A balance as in claim 9 wherein said torsion webs are circumferentially spaced along said upper and lower periphery and have a wedge cross sectional configuration.

13. A balance as in claim 12 wherein said plurality of beams connecting the forward and aft non-webbed portions of said roll section consists of a first and second set of beams diametrically opposed and located proximate the outer periphery of said roll section and wherein each set of beams consists of an integrally connected support beam, thin flexure beam intermediate beam and roll gage beam.

14. A balance as in claim 13 wherein wire grooves are provided along the outer surface of said longitudinal beams, said longitudinal beams being integrally connected and forming a wall near the aft portion of said axial cage proximate said axial gage beam, and a hole formed within said wall providing for the unrestrained passage of said crossbeam.

15. A rolling moment measurement balance subjected to aerodynamic loads including a rolling moment in a flow field in a wind tunnel, said balance adapted for mounting at one end to said tunnel and at the other end to a test model, comprising:
a series of torsion webs spaced only at the upper and the lower periphery of said balance, said torsion webs being capable of allowing twist deflections of the balance for rolling moment measurement but providing a structural constraint on deflections along the pitch and yaw axes,
a plurality of thin beams of rectangular cross-section connecting the forward and aft non-webbed portions of said roll section, said beams consisting of a support beam integral with the forward portion of said roll section said support beam having a recess therein defining a transverse thin beam, a thin intermediate beam integral with said thin beam, said intermediate beam being integrally connected to a roll gage beam capable of deflection in response to a rolling moment, and
means responsive to the deflection of said balance for indicating the magnitude and direction of said rolling moment;
whereby said thin beam is capable of reducing any deflections potentially induced in said roll gage beam due to an axial force or pitching moment, said intermediate beam carrying the responsibility of reducing any side force and yaw load which may potentially be sensed by said roll gage beam.

16. A balance as in claim 15 wherein said balance is connected at said one end by means of a sting.

17. A balance as in claim 15 wherein said balance is connected at said one end by means of a pitch and yaw load measurement section, said pitch and yaw load measurement section being connected to a sting, and; wherein said sting is connected to said tunnel.

18. A balance as in claim 15 wherein said balance is connected at said other end by means of a model mounting taper.

19. A balance as in claim 15 wherein said balance is connected at said other end to a pitch and yaw load measuring section, said section being mounted to a model mounting taper and; wherein said taper is mounted to said test model.

20. An axial force measurement section subjected to aerodynamic loads including an axial force in a flow field found within a test wind tunnel, said section adapted for mounting at one end to said tunnel and at the other end to a test model, comprising:
- longitudinal beams of cruciform construction acting as an integral unit,
- a plurality of axial deflection beams integrally formed with said longitudinal beams allowing said longitudinal beams to respond as a unit under the application of an axial force without transmitting roll moments or pitch and yaw loads,
- a central beam fixed relative to said longitudinal beams and integrally formed with said axial deflection beams,
- a cross beam integrally connected to said central beam at one end and at its other end to an axial gage beam which is capable of deflection in response to an axial force,
- said axial gage beam also being integrally formed with said longitudinal beams via thin flexure beams,
- whereby said longitudinal beams structurally transmit the resultant aerodynamic axial force to said axial gage beam, said axial deflection beams having the structural capability of carrying pitch and yaw loads and roll moments substantially eliminating deflection of said axial gage beam due to said loading, said thin flexure beams, acting as pin joints, reduce interaction and transmit, from the longitudinal beams, the axial force loading to the axial gage beam, and;
- means mounted on said axial gage beam responsive to the deflection of the axial gage beam for indicating the axial force vector.

21. A section as in claim 20 wherein said section is mounted at said one end via a pitch and yaw load measurement section.

22. A section as in claim 21 wherein said central beam is connected to said pitch and yaw load measurement section.

23. A section as in claim 20 wherein said other end is connected to a pitch and yaw load measurement section,
- said pitch and yaw load measurement section being connected to a model mounting taper, and;
- said taper being mounted to said model.

* * * * *